United States Patent [19]

Pollock et al.

[11] Patent Number: 4,798,394

[45] Date of Patent: Jan. 17, 1989

[54] KINGPIN ASSEMBLY FOR A VEHICLE STEERING AXLE

[75] Inventors: Paul R. Pollock; Larry P. Stoneburner, both of Fort Wayne, Ind.

[73] Assignee: Dana Corporation, Toledo, Ohio

[21] Appl. No.: 919,888

[22] Filed: Oct. 15, 1986

[51] Int. Cl.[4] ............................................. B62D 7/18
[52] U.S. Cl. ................................. 280/96.1; 280/93
[58] Field of Search ................. 280/93, 96.1; 384/519, 384/500, 540, 582; 150/233, 234, 252

[56] References Cited

U.S. PATENT DOCUMENTS

| | | | |
|---|---|---|---|
| 805,716 | 11/1905 | Demory | 280/96.1 |
| 854,451 | 5/1907 | Bideau | 280/96.1 |
| 1,181,612 | 5/1916 | Reinke et al. | 280/96.1 |
| 1,384,309 | 7/1921 | Druar | 280/96.1 |
| 1,422,346 | 7/1922 | Druar | 280/96.1 |
| 1,446,240 | 2/1923 | Zimmerman | 280/96.1 |
| 1,452,531 | 4/1923 | Sherbondy | 280/96.1 |
| 1,471,575 | 10/1923 | Simons | 280/96.1 |
| 1,489,383 | 4/1924 | Church | 280/96.1 |
| 1,503,239 | 7/1924 | Gunn | 280/96.1 |
| 1,503,511 | 8/1924 | Masury | 280/96.1 |
| 1,568,782 | 1/1926 | Swayne | 280/96.1 |
| 1,613,768 | 1/1927 | Perrot | 280/96.1 |
| 1,697,784 | 1/1929 | Seaholm | 384/396 X |
| 1,766,859 | 6/1930 | Vincent | 280/96.1 |
| 1,783,614 | 12/1930 | Griswald | 280/96.1 |
| 1,859,149 | 5/1932 | Meggs | 280/96.1 |
| 1,862,513 | 6/1932 | Bijur | 280/96.1 |
| 1,912,359 | 6/1933 | Bijur | 280/96.1 |
| 1,939,653 | 12/1933 | Bijur | 280/96.1 |
| 2,094,945 | 10/1937 | Hesselrode | 280/96.1 |
| 2,147,787 | 2/1939 | Ferguson | 384/540 |
| 2,512,881 | 6/1950 | Smiley, Jr. | 384/396 X |
| 2,613,091 | 10/1952 | Funnell | 384/396 |
| 2,665,957 | 1/1954 | Glander | 384/396 |
| 2,829,903 | 4/1958 | Ulinski | 280/96.1 |
| 2,888,100 | 5/1959 | Chandler | 280/96.1 |
| 3,342,507 | 9/1967 | Koch et al. | 280/96.1 |
| 3,441,288 | 4/1969 | Boughner | 280/96.1 |
| 3,542,392 | 11/1970 | Cumming | 280/96.1 |
| 3,659,869 | 5/1972 | Hase | 280/96.1 |
| 3,915,469 | 10/1975 | Vanice | 280/96.1 |
| 3,980,151 | 9/1976 | Murayama et al. | 280/96.1 |
| 4,043,567 | 8/1977 | Kaiser | 280/96.1 |
| 4,229,017 | 10/1980 | Hagedorn | 280/96.1 |
| 4,286,799 | 9/1981 | Ayres | 280/96.1 |

FOREIGN PATENT DOCUMENTS 421335 12/1934 United Kingdom ................ 384/519

Primary Examiner—John J. Love
Assistant Examiner—Karin L. Ferriter
Attorney, Agent, or Firm—MacMillan, Sobanski & Todd

[57] ABSTRACT

A steerable axle assembly having an axle with a generally vertically extending bore therein, a kingpin that is non-rotatably positioned in the bore in the axle in such a manner that the kingpin is longitudinally engaged by the bore so that the kingpin can not drift upwardly in the bore, the kingpin having upper and lower cylindrical portions that receive first and second tapered roller bearings, respectively, the first and second tapered roller bearings being retained, respectively, in apertures in upper and lower yoke arms of a steering knuckle. The first and second tapered roller bearings are adjustably preloaded by an externally threaded bearing adjuster that is threaded into an internally threaded portion of the aperture in the upper yoke arm of the steering knuckle. The aperture in the upper yoke arm is covered by bolting an end of the steering arm to the upper yoke arm over the aperture and the aperture in the lower yoke arm is covered by bolting an end of the tie rod to the lower yoke arm over the aperture. The kingpin is prevented from migrating upwardly within the bore in the axle either by providing the kingpin with a tapered portion that engages a tapered bore, or by providing the kingpin with a shoulder between a lower, larger diameter portion and a higher, smaller diameter portion that engages a shoulder in the bore between an upper bore portion and a lower counterbore portion.

29 Claims, 3 Drawing Sheets

KINGPIN ASSEMBLY FOR A VEHICLE STEERING AXLE

BACKGROUND OF THE INVENTION

The present invention relates in general to vehicle steering systems and in particular to an improved tapered kingpin assembly for a steering axle.

Steering axle assemblies for vehicles are well known in the art. Such assemblies are usually provided on the front axle of a vehicle, the outside ends of which are provided with means for pivotally mounting respective steering knuckles thereupon. To achieve this pivotal mounting, a kingpin is typically mounted at each end of the axle. The steering knuckle includes bearing means adapted to rotatably engage the kingpin and pivot relative to the axle. Spindles are provided at the outer ends of the steering knuckles, upon which the wheels of the vehicle may be mounted.

It will be appreciated that such kingpin assemblies constitute an important portion of a steering system of the vehicle. In the past, vehicle kingpin assemblies have been relatively complicated mechanical structures. Assembly and maintenance of such prior art kingpin assemblies were difficult and time-consuming. Also, because of the number of parts involved and the difficulties in working with them, such prior art kingpin assemblies were relatively expensive. Accordingly, it would be desirable to provide an improved kingpin assembly having fewer parts and a simpler construction, while maintaining the reliability and durability thereof.

SUMMARY OF THE INVENTION

The present invention relates to an improved tapered kingpin assembly for a vehicle steering axle which is particularly well suited for the load and service requirements of medium and heavy duty trucks. At each end of the axle, an aperture is formed therethrough which tapers in diameter inwardly from the bottom side to the top side. A kingpin is provided having a tapered central portion disposed between opposed cylindrical end portions. The tapered central portion of the kingpin is adapted to be received and maintained within the tapered aperture of the axle. Tapered bearings are provided about each of the cylindrical end portions of the kingpin for rotatably mounting a steering knuckle thereto. The end of a steering arm of the vehicle provides an upper closure for the kingpin assembly, while the end of a tie rod arm of the vehicle provides the lower closure. The steering arm and the tie rod arm are bolted in covering relationship to the opposed ends of the kingpin assembly and are secured together by threaded fasteners which extend throughout the kingpin assembly. A bearing adjuster is threaded within the steering knuckle between the end of the steering arm and the upper end of the kingpin to exert an adjustable pre-loading force against the upper tapered bearing assembly. A spacer ring can be provided between the lower tapered bearing assembly and the tie rod arm. Alternatively, the lower bearing assembly may directly abut the end of the tie rod arm.

By the use of a kingpin with a tapered portion, as heretofore described, the kingpin self-locks in the axle by virtue of the high contact loadings that develop between the engaging tapered surfaces of the kingpin and the aperture in the axle. Such self-locking eliminates the need for more complicated locking or anti-rotation features in the kingpin and the axle, such as engaging flat surface portions formed on the kingpin and the axle aperture or the use of draw keys engaging the kingpin through cross bores in the axle. Further, by the use of upper and lower tapered bearings for rotatably mounting the steering knuckle with respect to the kingpin, the bushing and thrust bearing components that characterize many types of prior art kingpin assemblies can be eliminated, thereby simplifying the kingpin assembly and reducing its cost. The bolting of the steering arm and the tie rod arm in covering relationship to the opposed ends of the kingpin helps to keep the bearings and the other internal components of the kingpin assembly free from dust, dirt, and other foreign contaminants that are encountered in the use of the vehicle. The use of tapered roller bearings with a bearing adjuster permits the adjustment of the kingpin assembly to remove any looseness therein, a problem which required the replacement of the bushings and the kingpin in many prior art kingpin assemblies.

Accordingly, it is an object of the present invention to provide an improved kingpin assembly for a vehicle steering axle assembly.

It is another object of the present invention to provide such an improved kingpin assembly which is simpler and less expensive to construct and maintain.

Other objects and advantages of the present invention will become apparent to those skilled in the art from the following detailed description of the preferred embodiments, when read in light of the accompanying drawings.

BRIEF DESCRIPTION OF THE DRAWING

FIG. 6 is a fragmentary sectional elevational view of a first alternate embodiment of the tapered kingpin assembly illustrated in FIG. 1.

DETAILED DESCRIPTION OF THE PREFERRED EMBODIMENTS

Figure 1:
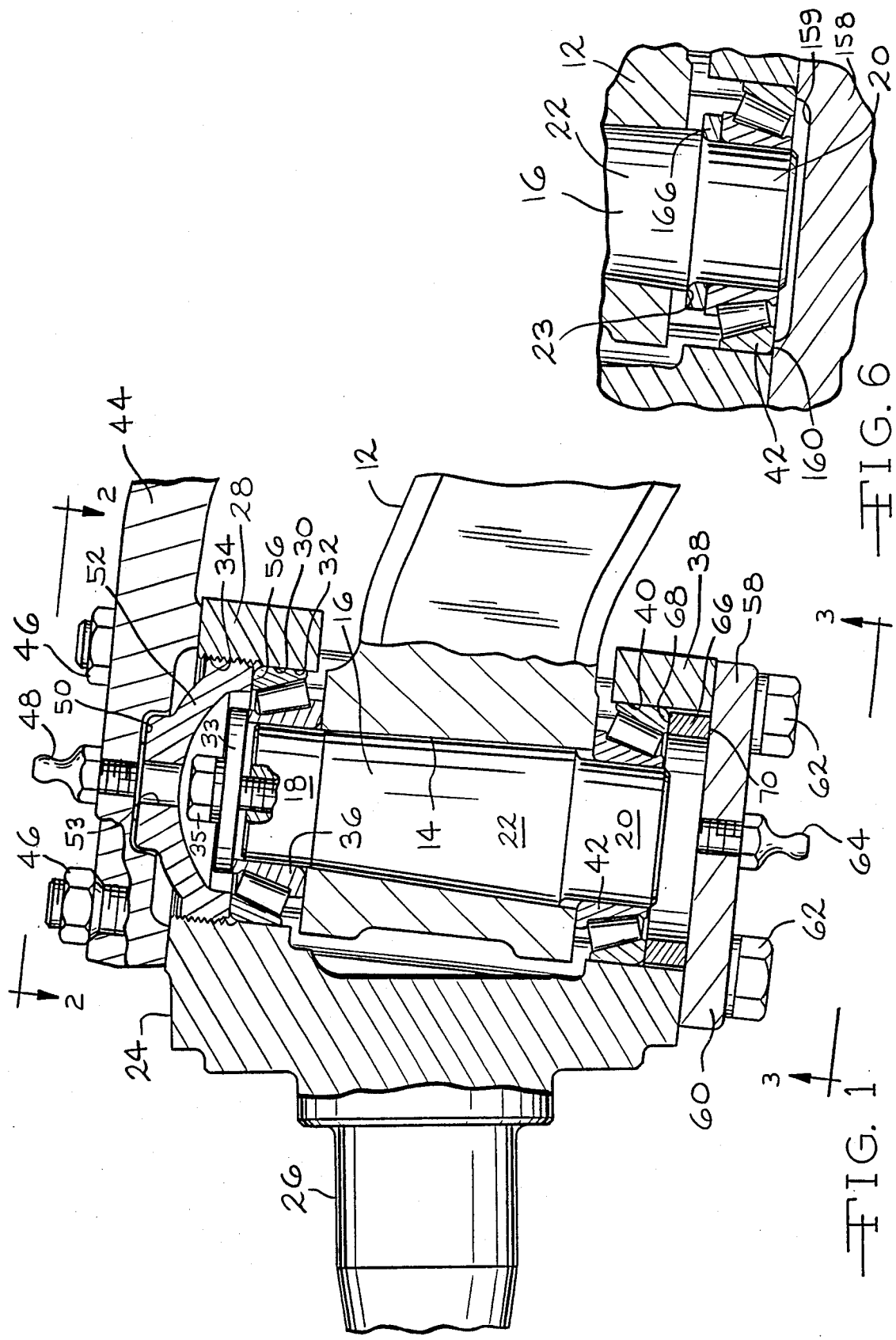
FIG. 1 is an elevational view, partly in section and partly broken away, of a tapered kingpin assembly for a vehicle steering axle assembly in accordance with the present invention.
Figure 2:
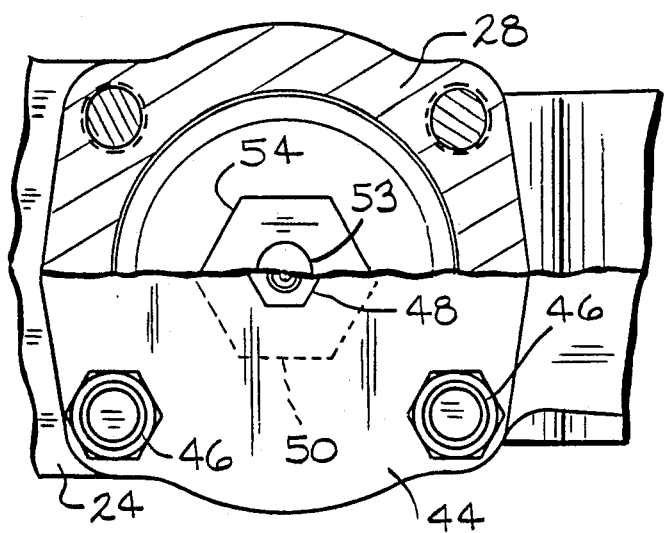
FIG. 2 is a top plan view, partially broken away, of the tapered kingpin assembly taken along line 2—2 of FIG. 1.
Figure 3:
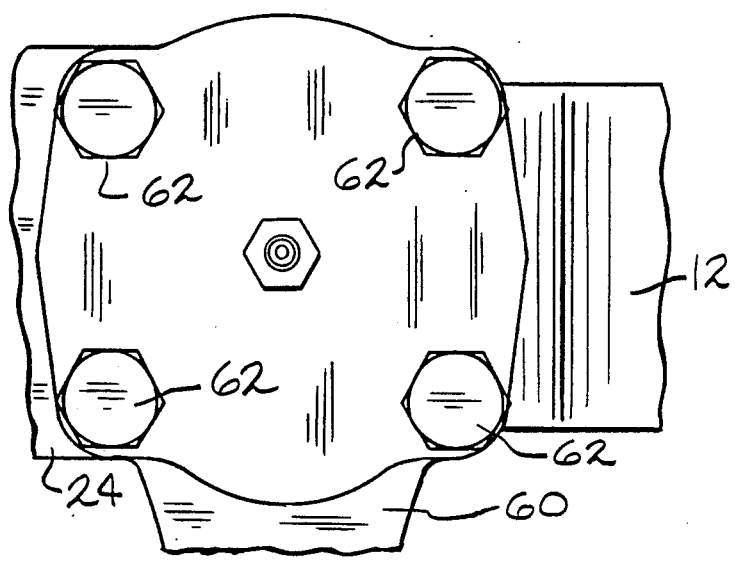
FIG. 3 is a bottom plan view of the tapered kingpin assembly taken along line 3—3 of FIG. 1.
Figure 4:
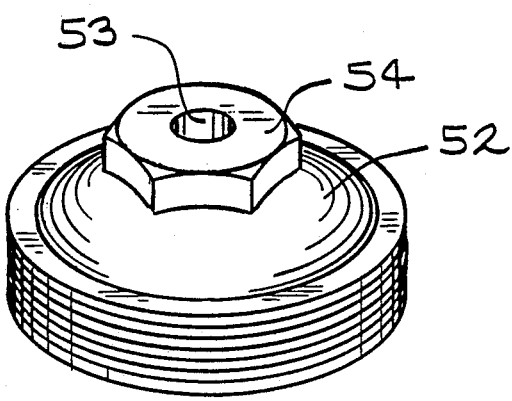
FIG. 4 is a perspective view of the bearing adjuster of the tapered kingpin assembly illustrated in FIG. 1.
Figure 5:
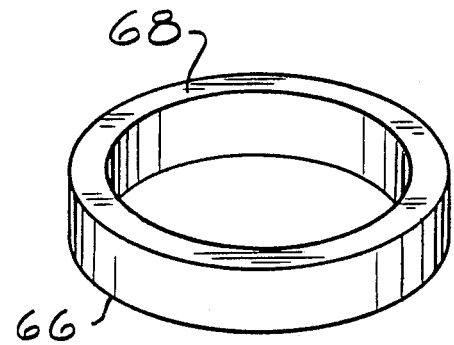
FIG. 5 is a perspective view of the bearing spacer ring of the tapered kingpin assembly illustrated in FIG. 1.

Referring now to the drawings, there is illustrated in FIG. 1 a kingpin assembly for a steerable axle of a motor vehicle, for example, a medium or a heavy duty truck. The kingpin assembly is indicated generally by reference numeral 10. The kingpin assembly 10 can be provided at each end of an axle 12, shown fragmentarily, of the associated vehicle. The axle 12 has a bore 14 extending therethrough adjacent the end thereof. The axle 12, preferably, is generally I-shaped in cross-section for optimum structural characteristics. For purposes which will be hereinafter explained more fully, the bore 14 of the axle 12 is tapered so as to be frustoconical in configuration, having a greater diameter at the lower end of the bore 14, in the orientation shown in FIG. 1, than at the upper end thereof. The kingpin assembly 10 also includes a kingpin 16 having a first cylindrical end portion 18, a second cylindrical end portion 20, and a tapered or frustoconical central portion 22 which extends between the first cylindrical end portion 18 and the second cylindrical portion 20. The tapered portion 22 of the kingpin 16 engages the tapered bore 14 of the axle 12 in surface-to-surface contact, to thereby develop high loads between the kingpin 16 and the bore 14, to prevent relative rotational movement therebetween. As shown, the kingpin 16 is positioned so that its longitudinal central axis extends generally vertically, preferably at some angle from a vertical position, toward the interior of the vehicle, for required steering efforts.

A steering knuckle 24, which has an integral outwardly extending wheel bearing spindle 26, is formed having an upper yoke arm 28 with an aperture 30 extending therethrough. The aperture 30 includes a lower cylindrical bore portion 32 that extends upwardly through the upper yoke arm 28 partially from the bottom thereof, and an upper internally threaded portion 34 that extends from the cylindrical bore portion 32 upwardly to the top of the upper yoke arm 28. The cylindrical bore portion 32 of the aperture 30 surrounds the first cylindrical end portion 18 of the kingpin 16, and is larger in diameter then such first cylindrical end portion 18. As a result, an annular space is provided about the first cylindrical end portion 18 in which a tapered roller bearing 36 is positioned. The kingpin 16 is kept from passing downwardly through the bore 14 of the axle 12 by a plate 33, an annular portion of which engages the top of the tapered roller bearing 36. The plate 33 s secured to the kingpin 16 by a bolt 35 which is threadably received in the kingpin 16. The engagement of the tapered portion 22 of the kingpin 16 with the tapered bore 14 in the axle 12 serves to prevent the kingpin 16 from drifting upwardly within the bore 14.

The lower end of the steering knuckle 24 is provided with a lower yoke arm 38 that has a cylindrical aperture 40 extending therethrough. The aperture 40 surrounds and is larger than the second cylindrical end portion 20 of the kingpin 16. As a result, an annular space is provided about the second cylindrical end portion 20 in which is positioned a second tapered roller bearing 42. Thus, by virtue of the use of the tapered roller bearings 36 and 42, the steering knuckle 24 may be rotated relative to the kingpin 16 and the axle 12 about an axis extending longitudinally through the kingpin 16 to steer the vehicle. The use of the tapered roller bearings 36 and 42, as opposed to the use of bushing and thrust bearings characteristic of various types of prior art kingpin assemblies, is facilitated by the precise axial positioning of the kingpin 16 within the bore 14 that results from the tapered configuration of the bore 14 and the tapered central portion 22 of the kingpin 16 that is engaged therein.

The rotation of the steering knuckle 24 with respect to the axle 12 is actuated by a steering arm 44, also shown fragmentarily. The steering arm 44 has an end portion that is bolted to the top of the upper yoke arm 28 of the steering knuckle 24 by bolt and nut assemblies 46. The steering arm 44 is provided with a lubrication fitting 48 for the lubrication of the upper portion of the kingpin assembly 10. The steering arm 44 also has a concave portion 50 which covers a bearing adjuster 52.

The bearing adjuster 52 is externally threaded for engagement in the internally threaded portion 34 of the aperture 30 formed through the upper yoke arm 28. The bearing adjuster 52 has a raised hexagonally shaped portion 54 formed integrally therewith at the top thereof to permit the bearing adjuster 52 to be threaded into or out of the internally threaded portion 34. The bearing adjuster 52 further includes an aperture 53 formed therethrough for the passage of lubricant from the lubrication fitting 48 into the interior of the kingpin assembly 10 and a bottom annular surface 56 of the bearing adjuster 52 which engages the top of the tapered roller bearing 36. Thus, by a virtue of the tightening or loosening of the contact between the bottom annular surface 56 of the bearing adjuster 52 and the upper surface of the tapered roller bearing 36, the tapered roller bearings 36 and 42 may be preloaded in any desired amount. Preferably, the concave portion 50 is hexagonally shaped to positively engage the hexagonally shaped portion 54 of the bearing adjuster 52 and thereby prevent rotation of the bearing adjuster 52 when the steering arm 44 is in its assembled position, as shown in FIG. 1. Concave portion 50 and the hexagonal shaped portion 54 could be any shape resulting in a finite rotational adjustment of adjuster 52.

The kingpin assembly 10 has an end of a tie rod arm 60, also shown fragmentarily, bolted to the bottom of the lower yoke arm 38 of the steering knuckle 24. The end 58 of the tie rod arm 60 is bolted to the bottom of the lower yoke arm 38 by bolt and washer assemblies 62, and is provided with a lubrication fitting 64 for the lubrication of the lower portion of the kingpin assembly 10. An annular spacer 66 is provided within the aperture 40 of the lower yoke arm 38 of the steering knuckle 24. The spacer 66 has a top surface 68 which engages the bottom of the second tapered roller bearing 42 and a bottom surface 70 which engages the top surface of the end 58 of the tie rod arm 60. Thus, the annular spacer 66 cooperates with the bearing adjuster 52 to determine the amount of the preloading of the tapered roller bearings 36 and 42. The bolted arrangement of the steering arm 44 relative to the top of the steering knuckle 24 and the bolted arrangement of the tie rod arm 60 relative to the bottom of the steering knuckle 24 to help to ensure that dirt, solvents, and other contaminants that are encountered in the normal service of the vehicle will be kept out of the interior of the kingpin assembly 10.

The use of tapered roller bearings 36 and 42 permits the kingpin assembly 10 to absorb both radially directed as well as axially directed loads. Heretofore, many types of kingpin assemblies utilized bushings to absorb radial loads, a technique that also required the use of thrust bearings to absorb axially directed loads. Thus, the kingpin assembly 10 of the present invention is simpler in construction than such prior art types of kingpin assemblies without any impairment in the functioning of the kingpin assembly 10 relative to such prior art devices. Further, the use of tapered roller bearings 36 and 42 in combination with the bearing adjuster 52 allows field servicing to remove any movement within the kingpin assembly 10 due to the looseness of any of its components, a problem which usually required the replacement of the kingpin and associated bushings in prior art kingpin devices, usually a very expensive procedure.

FIG. 6 illustrates a first alternate embodiment in which a modified annular spacer 166 is inserted between the second tapered roller bearing 42 and the tapered portion 22 of the kingpin 16. The spacer 166 engages a shoulder portion 23 of the kingpin 16 that extends between the bottom of the tapered portion 22 and the top of the second cylindrical end portion 20. The bottom of the tapered portion 22 has a diameter that is greater than that of the second cylindrical portion 20. In the embodiment of FIG. 6, there is also provided a modified end 158 of the associated tie rod arm. The end 158 is provided with a recess 159 therein to receive a portion of the second cylindrical end portion of the kingpin 16, which extends below the second tapered roller bearing 42. The recess 159 has a diameter which is less than the outside diameter of the second tapered roller bearing 42 to provide an annular portion 160 of the end 158 of the tie rod arm to support the underside of the second tapered roller bearing 42.

Figure 7:
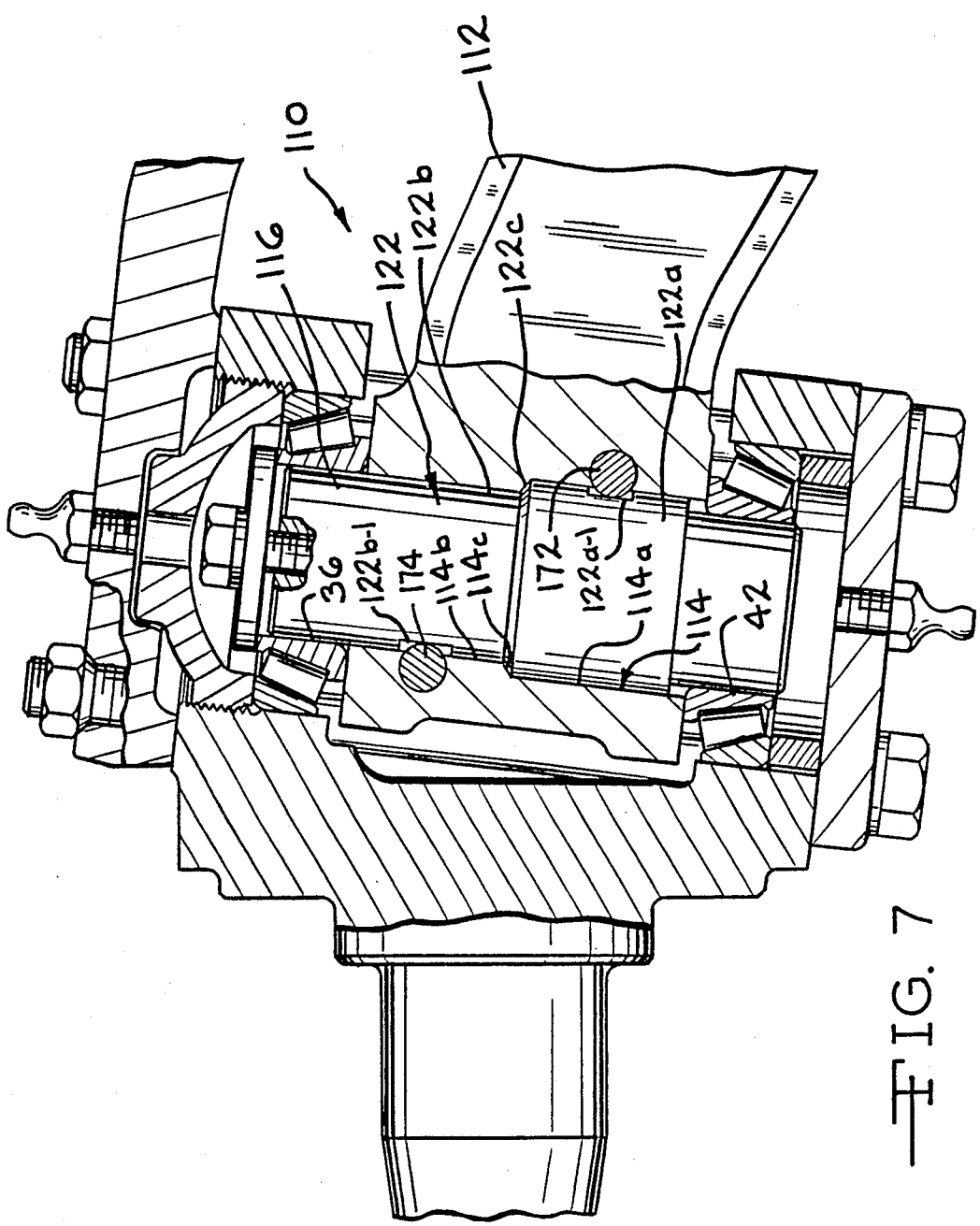
FIG. 7 is a view similar to FIG. 1 of a second alternate embodiment of a kingpin assembly according to the present invention.

FIG. 7 illustrates a second alternate embodiment of a kingpin assembly, generally indicated by reference numeral 110, that incorporates an alternative design of a kingpin 116. The kingpin 116 differs from the kingpin 16 of the embodiments of FIGS. 1 through 6 in that the kingpin 116 has an intermediate portion 122 which is stepped in configuration, rather than being tapered in configuration in the case of the intermediate portion 22 of the kingpin 16 of FIGS. 1 through 6. Thus, the intermediate portion 122 of the kingpin 116 has a lower cylindrical portion 122a of a first diameter, an upper cylindrical portion 122b of a second and smaller diameter, and a shoulder 122c that extends between the lower end of the upper cylindrical portion 122b and the upper end of the lower cylindrical portion 122a. The kingpin assembly 110 also differs from the kingpin assembly 10 in that it incorporates an alternate axle 112. The axle 112 differs from the axle 12 of the kingpin assembly 10 by virtue of the configuration of the bore 114 that extends therethrough. To properly engage the intermediate portion 122 of the kingpin 116, the bore is provided with a lower bore portion 114a to receive the lower cylindrical portion 122a of the kingpin 116, a smaller upper bore portion 114b to receive the upper cylindrical portion 122b of the kingpin 116, and a shoulder 114c that extends between the lower end of the upper bore portion 114b and the upper end of the lower bore portion 114a. The shoulder 114c of the bore 114 of the axle 112 engages the shoulder 122c of the kingpin 116 to prevent the kingpin 116 from rising in the bore 114, thus performing one of the functions of the tapered portion 22 of the kingpin 16 of the prior embodiments, and to help to maintain the desired amount of preload on the tapered roller bearings 36 and 42. However, the stepped kingpin 116 of the embodiment of FIG. 7 is not self-locking within the bore 114 of the axle 112 as is the tapered kingpin 16 of the prior embodiments. Thus, in the embodiment of FIG. 7, he kingpin assembly 110 is provided with draw keys 172 and 174 that engage flattened portions 122a-1 and 122b-1 of the lower cylindrical portion 122a and the upper cylindrical portion 122b, respectively, of the kingpin 116 to prevent the rotation of the kingpin 116 with, the bore 114.

In accordance with the provisions of the patent statues, the principle and mode of operation of the present invention have been explained and illustrated in its preferred embodiment. However, it must be appreciated that the present invention can be practiced otherwise than as specifically explained and illustrated without departing from its spirit or scope.

What is claimed is:

1. A steerable axle assembly comprising:

an axle member having a generally vertically extending bore extending therethrough, said bore having a first diameter at a location adjacent the bottom thereof and a second diameter at a location adjacent the top thereof, said first diameter being larger than said second diameter, said bore further having a surface extending between the bottom thereof and the top thereof and including a lower cylindrical portion and an upper cylindrical portion, said lower cylindrical portion being larger in diameter than said upper cylindrical portion, said surface of said bore further including a generally radially extending shoulder extending between said lower cylindrical portion and said upper cylindrical portion;

a kingpin having an upper cylindrical end, a lower cylindrical end, and an intermediate portion which is disposed between said upper cylindrical end and said lower cylindrical end, said intermediate portion of said kingpin having a first diameter at a location adjacent the bottom thereof and a second diameter at a location adjacent the top thereof, said first diameter being larger than said second diameter, said intermediate portion further having a surface that extends from the bottom thereof to the top thereof, said surface of said intermediate portion including a lower cylindrical portion and an upper cylindrical portion, said lower cylindrical portion being larger in diameter than said upper cylindrical portion, said surface of said intermediate portion further including a generally radially extending shoulder extending between said lower cylindrical portion and said upper cylindrical portion, said generally radially extending shoulder of said intermediate portion engaging said generally radially extending shoulder of said bore to prevent upward movement of said kingpin in said bore of said axle, said kingpin being positioned in said bore of said axle member in at least partial, surface-to-surface contact therewith;

a steering knuckle having a wheel carrying spindle portion, an upper yoke arm, and a lower yoke arm, said upper yoke arm having an aperture therethrough which surrounds at least a part of said upper cylindrical end of said kingpin, said lower yoke arm having an aperture therethrough which surrounds at least a part of said lower cylindrical end of said kingpin;

first thrust-absorbing annular bearing means positioned within said aperture in said upper yoke arm of said steering knuckle and surrounding said at least a part of said upper cylindrical end of said kingpin;

second thrust absorbing annular bearing means positioned within said aperture in said lower yoke arm of said steering knuckle and surrounding said at least a part of said lower cylindrical end of said kingpin;

bearing preloading means comprising first means positioned within said aperture in said upper yoke arm of said steering knuckle for providing an adjustable amount of preloading on said first thrust-absorbing annular bearing means and said second thrust-absorbing annular bearing means; and anti-rotation means for preventing relative rotational movement between said kingpin and said axle.

2. A steerable axle assembly according to claim 1 wherein said axle member has an annular portion with a top and a bottom, said annular portion surrounding said bore, wherein said first thrust-absorbing annular bearing means bears against said top of said annular portion of said axle member, and wherein said bottom of said annular portion of said axle bears against said second thrust-absorbing annular bearing means, whereby a load against said first thrust-absorbing annular bearing means that is directed toward said second thrust-absorbing annular bearing means will result in a load on said second thrust-absorbing annular bearing means.

3. A steerable axle assembly according to claim 2 wherein at least one of said first thrust-absorbing annular bearing means and said second thrust-absorbing annular bearing means is a tapered roller bearing.

4. A steerable axle assembly according to claim 1 and further comprising:
a steering arm having an end portion; and means for attaching said end portion of said steering arm to said upper yoke arm of said steering knuckle to cover said aperture in said upper yoke arm of said steering knuckle, said first thrust-absorbing annular bearing means and said first means of said bearing preloading means to protect said upper cylindrical end of said kingpin and said first thrust-absorbing annular bearing means from contamination by dirt.

5. A steerable axle assembly according to claim 4 wherein said end portion of said steering arm is provided with a lubrication fitting to permit lubrication of said first thrust absorbing annular bearing means.

6. A steerable axle assembly according to claim 1 and further comprising:
a tie rod having an end portion; and means for attaching said end portion of said tie rod to said lower yoke arm of said steering knuckle to cover said aperture in said lower yoke arm of said steering knuckle to protect said lower cylindrical end of said kingpin and said second thrust-absorbing annular bearing means from contamination by dirt.

7. A steerable axle assembly according to claim 6 wherein said end portion of said tie rod is provided with a lubrication fitting to permit lubrication of said second thrust-absorbing annular bearing means.

8. A steerable axle assembly according to claim 1 steering knuckle has an internally threaded portion and wherein said first means of said bearing preloading means comprises an externally threaded member that is threadably received in said internally threaded portion.

9. A steerable axle assembly according to claim 4 wherein said aperture in said upper yoke arm of said steering knuckle has an internally threaded portion, wherein said first means of said bearing preloading means comprises an externally threaded member that is threadably received in said internally threaded portion, said externally threaded member being covered by said end portion of said steering arm and having a hex nut portion that projects therefrom toward said end portion of said steering arm to permit the adjustment of the position of said externally threaded member within said internally threaded portion of said aperture in said upper yoke arm upon the removal of said end portion of said steering arm from steering knuckle.

10. A steerable axle assembly according to claim 9 wherein said end portion of said steering arm is provided with a lubrication fitting and said externally threaded member is provided with an aperture extending therethrough to permit lubrication of said first thrust-absorbing annular bearing means through said externally threaded member.

11. A steerable axle assembly according to claim, 1 wherein said bearing preloading means further comprises second means positioned within said lower yoke arm of said steering knuckle and wherein said second means of said bearing preloading means comprises annular spacer means that is compressively engaged between said second thrust-absorbing annular bearing means and said end portion of said tie rod.

12. A steerable axle assembly comprising:
an axle member including a bore extending therethrough, said bore having a surface extending between a bottom and a top of said axle member;
a kingpin including an intermediate portion having a surface, said kingpin being positioned in said bore of said axle member in at least partial surface-to-surface contact therewith;
a steering knuckle having a wheel carrying spindle portion and an upper yoke arm, said upper yoke arm having an aperture formed therethrough which surrounds at least a part of said kingpin; and
a steering arm including an end portion, said end portion of said steering arm being attached to said upper yoke arm of said steering knuckle to cover said aperture.

13. The invention defined in claim 12 further including bearing means disposed about an upper portion of said kingpin for rotatably connecting said steering knuckle to said kingpin.

14. The invention defined in claim 13 further including bearing preloading means connected to said steering knuckle, and wherein said bearing means is disposed between said bearing preloading means and said top of said axle member.

15. The invention defined in claim 14 wherein said bearing preloading means is threaded into an internally threaded portion of said upper yoke arm aperture such that rotation of said bearing preloading means relative to said upper yoke are varies the amount of preloading exerted on said bearing means.

16. The invention defined in claim 15 wherein said bearing preloading means further includes a raised portion which cooperates with a correspondingly shaped concave portion formed in said end portion of said steering arm such that relative rotation of said bearing preloading means is prevented when said steering arm is attached to said upper yoke arm.

17. A steerable axle assembly comprising:
an axle member including a bore extending therethrough, said bore having a surface extending between a bottom and a top of said axle member;
a kingpin including an intermediate portion having a surface, said kingpin being positioned in said bore of said axle member in at least partial surface-to-surface contact therewith;
a steering knuckle having a wheel carrying spindle portion and a lower yoke arm, said lower yoke arm having an aperture formed therethrough which surrounds at least a part of said kingpin; and
a tie rod arm including an end portion, said end portion of said tie rod arm being attached to said lower yoke arm of said steering knuckle to cover said aperture.

18. The invention defined in claim 17 further including bearing means disposed about a lower portion of said kingpin for rotatably connecting said steering knuckle to said kingpin.

19. The invention defined in claim 18 further including spacer means disposed between said bearing means and said tie rod arm.

20. The invention defined in claim 18 further including spacer means disposed between said bearing means and said intermediate portion of said kingpin.

21. The invention defined in claim 18 wherein said steering knuckle further includes an upper yoke arm having an aperture formed therethrough which surrounds at least a part of said kingpin and a steering arm attached to said upper yoke arm of said steering knuckle to cover said aperture.

22. The invention defined in claim 21 further including bearing means disposed about an upper portion of said kingpin for rotatably connecting said steering knuckle to said kingpin.

23. The invention defined in claim 22 further including bearing preloading means connected to said steering knuckle, and wherein said bearing means is disposed between said bearing preloading means and said top of said axle member.

24. The invention defined in claim 23 wherein said bearing preloading means is threaded into an internally threaded portion of said upper yoke arm aperture such that rotation of said bearing preloading means relative to said upper yoke arm varies the amount of preloading exerted on said bearing means.

25. The invention defined in claim 24 wherein said bearing preloading means further includes a raised portion which cooperates with a correspondingly shaped concave portion formed in said end portion of said steering arm to prevent relative rotation of said bearing preloading means when said steering arm is attached to said upper yoke arm.

26. A steerable axle assembly comprising:
an axle member including a bore extending therethrough, said bore having an upper cylindrical portion defining a first diameter and a lower cylindrical portion defining a second diameter, said second diameter being larger than said first diameter so as to define a shoulder extending about said bore between said upper and lower portions;
a kingpin including an upper cylindrical end defining a first diameter and a lower cylindrical end defining a second diameter, said second diameter being larger than said first diameter so as to define a shoulder extending about said kingpin between said upper and lower ends, said shoulder of said kingpin engaging said shoulder of said bore to prevent upward movement of said kingpin within said bore; and
means for preventing relative rotational movement between said kingpin and said axle.

27. The invention defined in claim 26 wherein said means for preventing includes draw key means disposed in said axle member for engaging said kingpin to prevent relative rotational movement therebetween.

28. The invention defined in claim 27 wherein said draw key means includes a first draw key disposed in an aperture formed in said axle member engaging a flattened portion formed on one of said upper and lower cylindrical ends of said kingpin.

29. The invention defined in claim 28 wherein said draw key means further includes a second draw key disposed in an aperture formed in said axle member engaging a flattened portion formed on the other of said upper and lower cylindrical ends of said kingpin.

* * * * *

UNITED STATES PATENT AND TRADEMARK OFFICE
CERTIFICATE OF CORRECTION

PATENT NO. : 4,798,394
DATED : January 17, 1989
INVENTOR(S) : Paul R. Pollock et al.

It is certified that error appears in the above-identified patent and that said Letters Patent is hereby corrected as shown below:

Column 7, Line 43,      after "claim 1", insert -- wherein said aperture in said upper yoke arm of said --.

Column 8, Line 1,      change "claim, 1" to -- claim 1 --.

Column 8, Line 39,      change "yoke are varies" to -- yoke arm varies --.

Signed and Sealed this

Twenty-seventh Day of June, 1989

Attest:

DONALD J. QUIGG

Attesting Officer      Commissioner of Patents and Trademarks